April 18, 1933. R. DOUGLASS 1,904,720
CAN UNLOADER
Filed Dec. 13, 1928   3 Sheets-Sheet 1
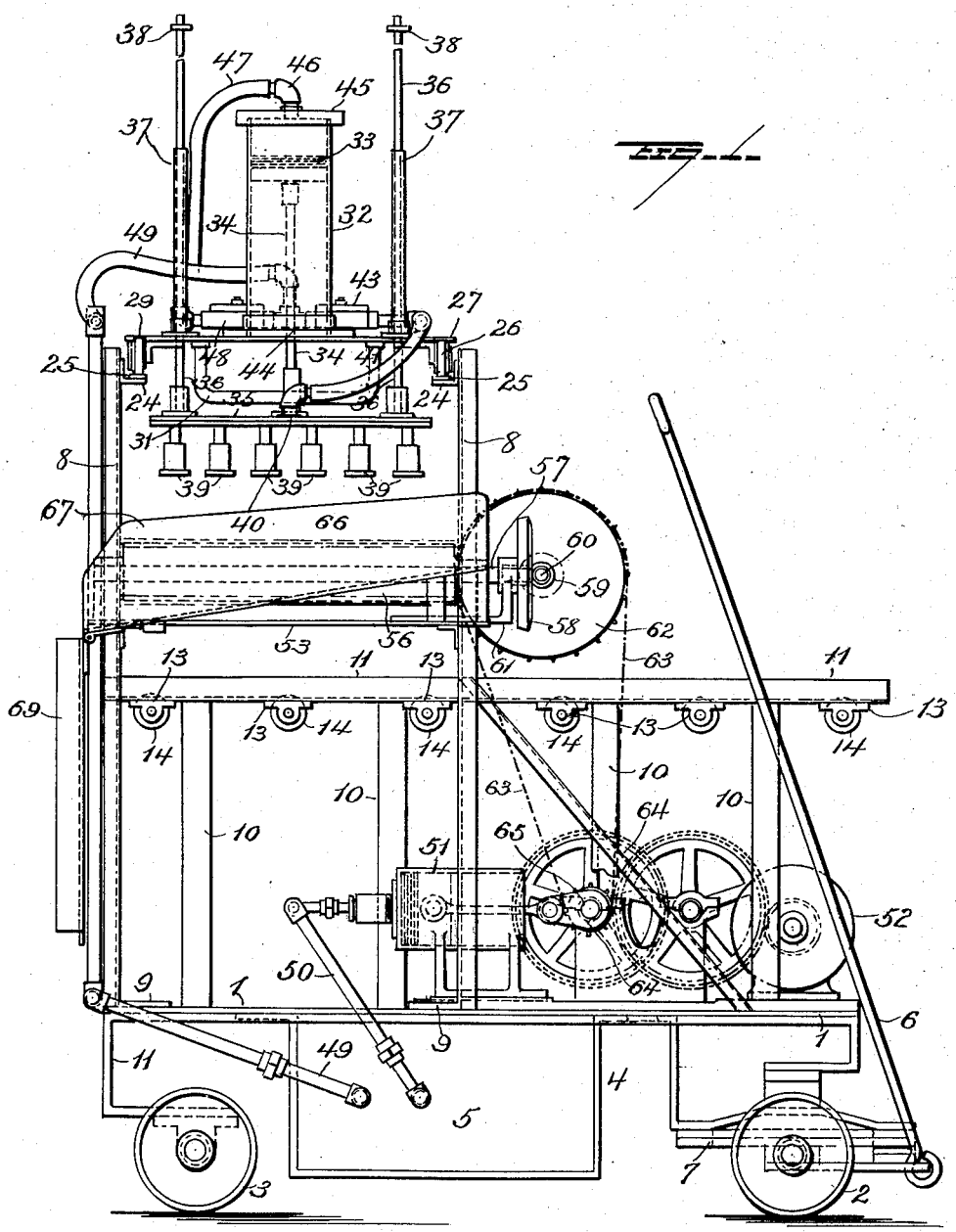
Inventor
R. Douglass
By Seymour & Bright
Attorneys

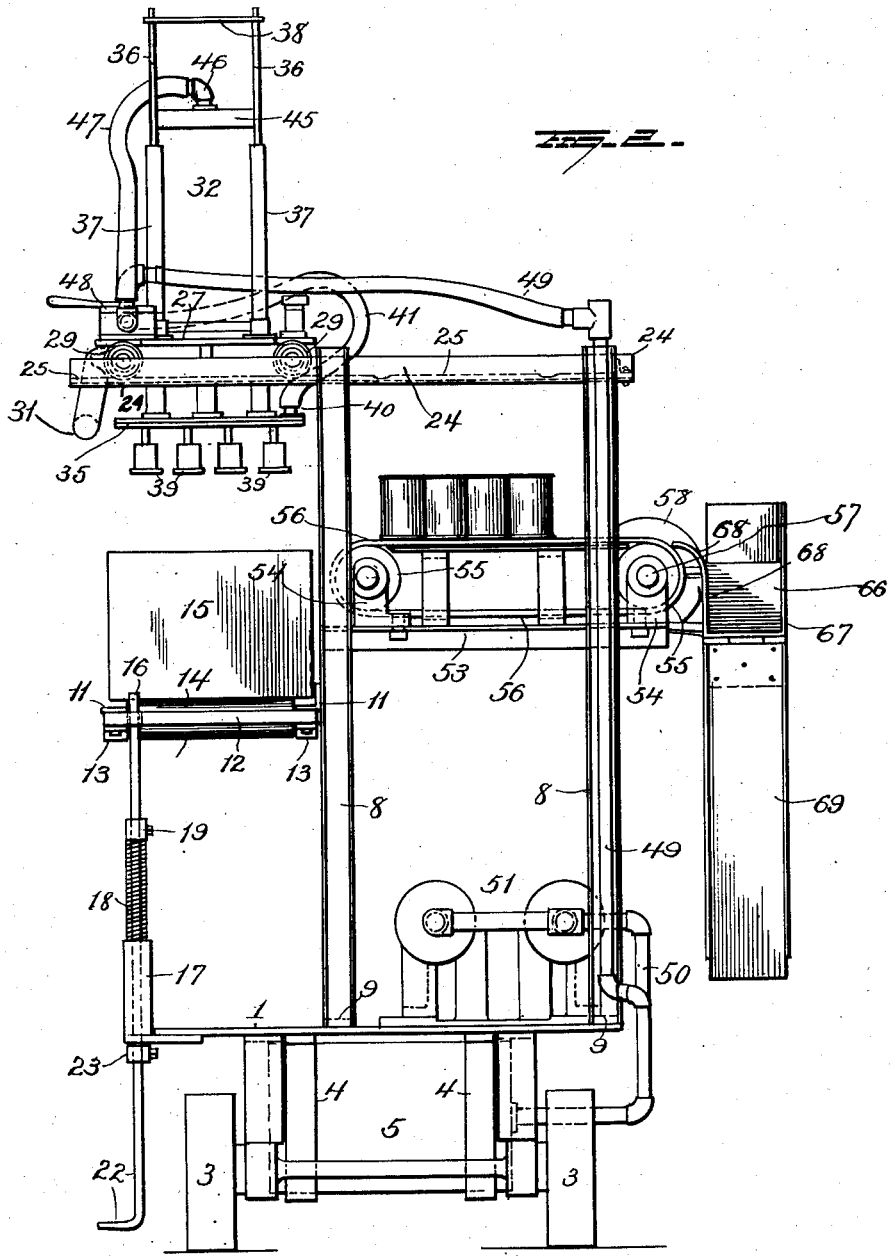

April 18, 1933.  R. DOUGLASS  1,904,720
CAN UNLOADER
Filed Dec. 13, 1928  3 Sheets-Sheet 3
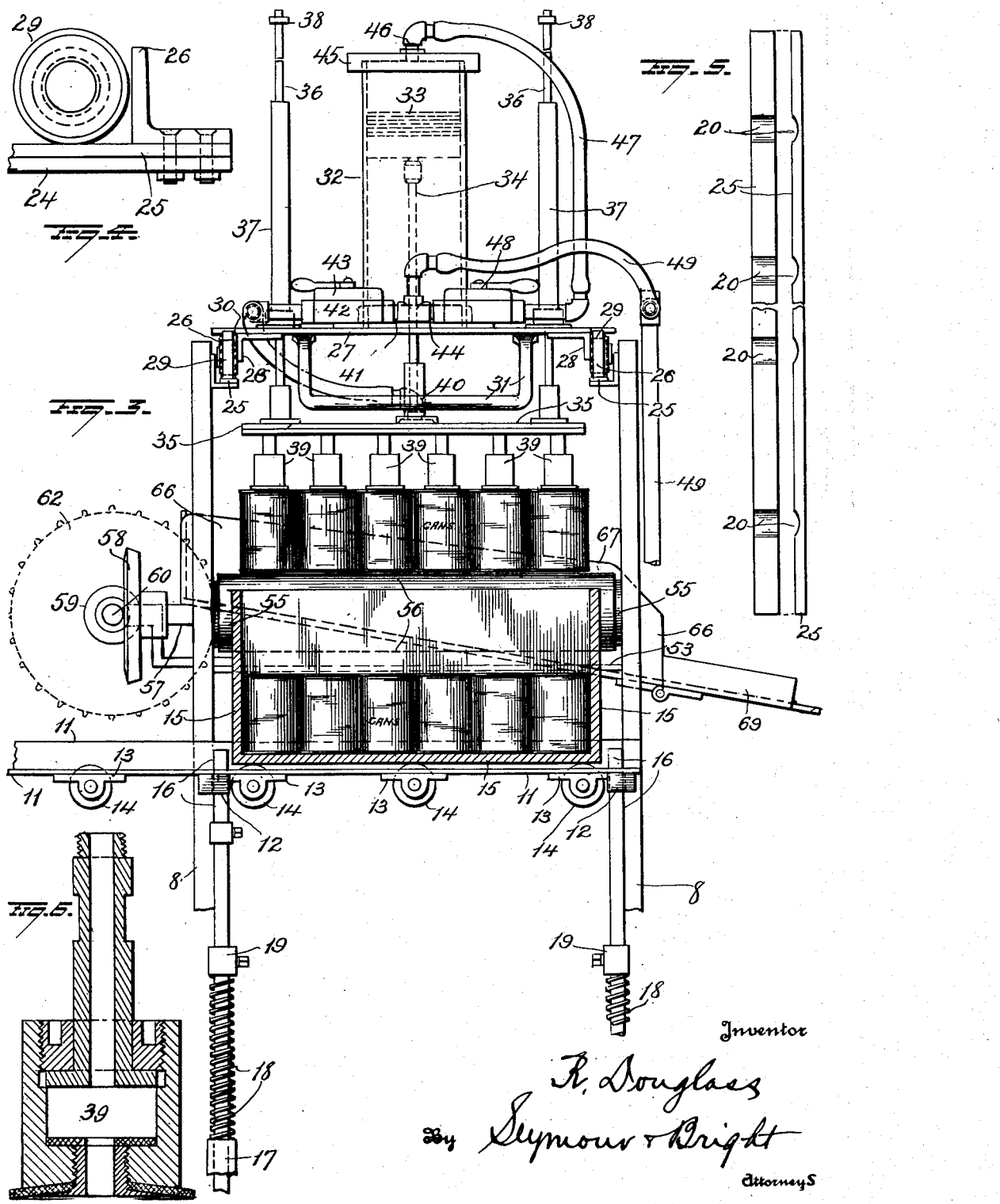

Patented Apr. 18, 1933

1,904,720

UNITED STATES PATENT OFFICE

ROYAL DOUGLASS, OF SOUTH BELLINGHAM, WASHINGTON

CAN UNLOADER

Application filed December 13, 1928. Serial No. 325,804.

This invention is a machine for removing cans from a case and delivering them to a labeling or lacquering machine. In canneries, it is customary to place the cans containing the goods to be cooked in trays, known as "coolers", which are housed in retorts for the cooking operation. After the cooking, the coolers are placed in a warehouse where the cans cool over night and are then packed in cases or boxes and stacked until an order is received whereupon they are removed from the case and run through machines for lacquering and labeling the cans after which they are placed in shipping containers. The object of the present invention is to minimize the manual labor involved in the removal of the cans from the boxes and their delivery to the lacquering and labeling machines, and to expedite the work. The invention is illustrated in the accompanying drawings and will be hereinafter fully set forth.

In the drawings, Figure 1 is a side elevation of a machine embodying the invention;

Figure 2 is a rear elevation;

Figure 3 is a partial side elevation, viewing the side opposite that seen in Fig. 1;

Figures 4 and 5 show details of the upper track structure,

Figure 6 is a vertical section through a suction cup.

The machine is preferably mounted on a truck in order that it may be readily moved from place to place according to the demand, the truck comprising a platform 1, front wheels 2, rear wheels 3, and a suitable frame 4 supporting the platform over the wheels. A vacuum tank 5 is also supported under the platform by the frame 4, and a draw bar or tongue 6 is connected with the front wheels through a fifth-wheel construction 7 whereby the truck may be moved and steered.

Rising from the platform in rectangular relation are standards 8 which are preferably channel bars having feet or brackets 9 at their lower ends rigidly secured to the platform, the standards being located at and near the rear end and at and near one side of the platform and suitable braces being secured to the standards and to the platform to attain the desired rigidity in the structure. Secured upon the front portion of the platform and in spaced relation along one side thereof are arched supporting frames 10, and track bars or rails 11 are secured to the tops of these frames to extend longitudinally of the platform with their rear ends alongside the inner pair of standards 8 and resting on and secured to cross bars or arms 12 projecting from said standards. Bearings 13 are secured to the under sides of the rails 11 and rollers 14 are carried by said bearings to provide a way over which a filled box, indicated at 15, may be easily moved to the unloading position. A stop pin 16 is slidably fitted through the outer end of the arm 12 and through a guide sleeve 17 secured to the rear corner of the platform, an expansion spring 18, coiled around the pin between the sleeve and an abutment collar 19 on the pin, serving to maintain the pin normally raised. A foot rest 22 is provided at the lower end of the stop pin so that the operator may exert pressure to release the pin, a stop collar 23 being secured on the pin below the guide sleeve to limit the upward movement in an obvious manner. When a filled box is against the stop, it will be in the proper position for unloading. After the cans have been removed, the stop is retracted so that the empty box may be withdrawn and a second box moved into position for unloading, and it will be understood that every time a box is moved to the unloading position another box is placed on the forward portion of the box track ready to be in turn moved to the unloading position. It will also be noted, on reference to Fig. 3, that a second stop pin corresponding in all respects to the described pin, may be provided to hold the second box from the first box.

Secured to the upper ends of the standards on the opposed sides thereof and extending over the rear portion of the box track, are angle bars 24 carrying rails 25 on which the unloader carriage runs and, in order that the travel of the carriage may be arrested at the proper points, stops 26 are secured on the forward rail adjacent the ends thereof while recesses or seats 20 are provided in the upper surface of the rear rail. The unloader carriage consists of a plate 27 having brackets 28 secured to its underside at its corners which carry rollers 29 to run upon the rails 25, the corners of the plate being recessed, as at 30, to provide clearance for the rollers. At the end nearer the unloading position, the carriage plate has a handle loop or bail 31 rigidly secured thereto so that the operator may move it to and fro upon the rails 25. A suction cylinder 32 is secured rigidly on the upper side of the carriage plate 27 and a piston 33 is fitted snugly but slidably therein, a piston rod 34 being secured to the under side of the piston and depending therefrom to a point below the carriage plate to be firmly secured to a suction head or plate 35. Adjacent the corners of the suction head, guide rods 36 are secured rigidly thereto and rise therefrom through tubes 37 on the carriage whereby the suction head is caused to move in a rectilinear path as it is raised and lowered. The upper ends of the guide rods are connected by cross bars or beams 38 as a further aid to maintaining the proper relative positions of the same.

The suction head is hollow and has a plurality of suction cups 39 secured to and depending from its under side, the cups being in communication with the interior of the head and being provided in number and arrangement corresponding to the number and arrangement of the cans in a tier in a box which is to be unloaded. On the upper side of the suction head, a nipple 40 is provided, said nipple being in communication with the interior of the head and having a hose 41 attached thereto. The hose 41 leads to a valve casing 42 on the carriage in which is mounted a manually operable valve 43 while the opposite side of the valve casing is in communication with a fitting 44 on the carriage. The upper end of the cylinder 32 is closed by a cap or head 45 having a central opening in which is fitted an elbow 46 to which is attached a hose 47 which leads to a manually operable control valve 48, said valve being essentially of the same construction as the valve 43 and likewise connected with the fitting 44. From the fitting 44, a conduit 49 leads to the vacuum tank 5. A pipe or conduit 50 leads from the vacuum tank to a suction pump 51 mounted on the platform 1 and driven by an electric motor 52 also mounted on the platform.

Secured to the standards 8 below the suction head and in a plane higher than the box track 11 is a plate 53 having boxes 54 secured upon its rear and front edge portions to journal rolls 55 supporting an endless belt conveyer 56. One of the rolls has a shaft 57 projecting beyond its front end and equipped with a beveled gear 58 meshing with a beveled pinion 59 fixed on a countershaft 60 which is journaled in a bearing bracket 61 secured upon and projecting forwardly from the plate or shelf 53. A sprocket wheel 62 is secured on one end of the shaft 60 and a sprocket chain 63 is trained about said wheel and a sprocket gear 64 on the pump shaft 65, travel being thus imparted to the conveyor. It will be noted that the conveyer travels transversely of the machine in a direction to carry cans placed thereon away from the box on the box track. At the delivery side of the conveyer, a chute 66 is secured to the standards 8 to receive the cans from the conveyer, the bottom of the chute being inclined downwardly so that the cans deposited therein will roll to the rear. The far side wall 67 of the chute projects above the plane of the conveyer so that it constitutes a guard to prevent the cans flying over the chute, while the near wall 68 is arched transversely to lie close to the bight of the conveyer and guide the cans into the chute. To the lower end of the chute is hinged an extension chute 69 which may hang down out of the way when not in use and when in use will form, in effect, a continuation of the chute 66 to direct the cans into a finishing machine.

In operation, a box containing cans set on end is placed in position on the box track adjacent the conveyer, as shown in Figs. 2 and 3, the suction head and cups being held in raised position by the suction in the cylinder 32. The carriage is drawn to a position over the box as shown in Fig. 2, and the valve 48 set to break the vacuum in the cylinder, permitting the suction head and cups to descend to the cans, each cup being caused to bear on the end of a can. The valve 43 is then set to establish vacuum in the cups so that the cans will be held by the cups through suction, whereupon the valve 48 is set to again establish a vacuum in the upper end of the cylinder whereby the piston will be raised by suction. The cans will thus be lifted from the box, and when they are clear of the box the carriage is pushed back to position over the conveyer, whereupon the valve 43 is manipulated to break the vacuum through the cups and permit the cans to drop onto the conveyer. The cycle of operations may be repeated indefinitely.

It is to be noted that the cans are on end on the conveyer and that they topple as they pass into the chute so that they lie on their sides therein and may roll therefrom by the force of gravity.

By this machine hand labor is minimized and the work is greatly expedited. With very slight changes the machine may be utilized to remove the cans from the coolers in which they are cooked.

Having fully described my invention what I claim as new and desire to secure by Letters Patents, is:—

1. Apparatus for the purpose set forth comprising a truck, a container-support on the truck, a conveyer transverse to said support, a chute receiving articles from the conveyer, a reciprocating carriage above the conveyer, suction cups on the carriage adapted to engage articles in a container on the container-support and release them onto the conveyer, a suction pump on the truck connected with the suction cups, a motor on the truck, and connections whereby the motor will operate the pump and the conveyer.

2. Apparatus for the purpose set forth comprising a frame, a conveyer mounted in the frame, means for supporting articles at one end of the conveyer, a chute at the opposite end of the conveyer receiving articles therefrom, tracks on the frame above the conveyer parallel therewith and extending over the article-supporting means, a carriage, adapted to reciprocate on the track, a suction head on the carriage, a plurality of suction cups carried by and in communication with the suction head and each adapted to engage an article on the article support for transferring the same to the conveyer, a suction cylinder on the carriage to raise and lower the suction head, a suction creating means in communication with the suction head and the suction cylinder, and means on the carriage to control the suction.

3. In apparatus of the character described, a reciprocating carriage, an air cylinder supported by the carriage, a piston in the air cylinder, a piston rod connected to the piston, an elevating platform connected to the rod, suction cups depending from the platform, a vacuum conduit operatively connected to the cylinder, and a valve on the carriage for controlling said conduit.

In testimony whereof, I have signed this specification.

ROYAL DOUGLASS.